US012359992B2

United States Patent
Miyoshi

(10) Patent No.: US 12,359,992 B2
(45) Date of Patent: Jul. 15, 2025

(54) TORQUE SENSOR APPARATUS

(71) Applicant: Honda Motor Co., Ltd., Tokyo (JP)

(72) Inventor: Takashi Miyoshi, Tokyo (JP)

(73) Assignee: Honda Motor Co., Ltd., Tokyo (JP)

( * ) Notice: Subject to any disclaimer, the term of this patent is extended or adjusted under 35 U.S.C. 154(b) by 241 days.

(21) Appl. No.: 18/070,474

(22) Filed: Nov. 29, 2022

(65) Prior Publication Data

US 2023/0228637 A1 Jul. 20, 2023

(30) Foreign Application Priority Data

Jan. 17, 2022 (CN) .......................... 202210047994.7

(51) Int. Cl.
| | | |
|---|---|---|
| *G01L 5/00* | (2006.01) | |
| *G01L 3/10* | (2006.01) | |
| *G01L 5/22* | (2006.01) | |

(52) U.S. Cl.
CPC ............ *G01L 5/0042* (2013.01); *G01L 3/101* (2013.01); *G01L 5/221* (2013.01)

(58) Field of Classification Search
CPC . G01L 3/101; G01L 3/104; G01L 5/22; G01L 5/221; G01L 5/0042
See application file for complete search history.

(56) References Cited

U.S. PATENT DOCUMENTS

| | | | | |
|---|---|---|---|---|
| 9,810,592 | B2 * | 11/2017 | Lee ......................... | G01L 3/101 |
| 2016/0054187 | A1 * | 2/2016 | Schoepe ................. | G01L 3/104 |
| | | | | 29/602.1 |
| 2020/0059138 | A1 * | 2/2020 | Kim ........................ | H02K 1/14 |
| 2021/0131826 | A1 * | 5/2021 | Froehlich ................ | G01D 5/12 |

FOREIGN PATENT DOCUMENTS

| | | |
|---|---|---|
| JP | 5207322 | 6/2013 |
| JP | 6254544 | 12/2017 |

* cited by examiner

*Primary Examiner* — Erika J. Villaluna
(74) *Attorney, Agent, or Firm* — JCIPRNET

(57) ABSTRACT

A torque sensor apparatus capable of suppressing the behavior of a vehicle when the vehicle breaks down even when an adhesive between a magnet and a sleeve is peeled off is provided. The torque sensor apparatus includes a rotor and a stator that are rotatable relative to each other and are respectively fixed to an input shaft and an output shaft. The torque sensor apparatus includes a sleeve, fixed to the input shaft and fixed to the magnet of the rotor; a position regulating portion, disposed on the magnet and restricting a rotational position of the magnet and the sleeve; and a protruding portion, disposed on the sleeve and installed corresponding to the position regulating portion. A front end of the protruding portion is enlarged along a circumferential direction of the sleeve.

4 Claims, 5 Drawing Sheets

TORQUE SENSOR APPARATUS

CROSS-REFERENCE TO RELATED APPLICATION

This application claims the priority benefit of China application serial no. 202210047994.7, filed on Jan. 17, 2022. The entirety of the above-mentioned patent application is hereby incorporated by reference herein and made a part of this specification.

BACKGROUND

Technical Field

The disclosure relates to a torque sensor apparatus, and in particular to a torque sensor apparatus for a steering shaft of a vehicle.

Description of Related Art

In recent years, with the restriction of vehicle exhaust regulations and carbon dioxide/fuel efficiency regulations, it is required to simultaneously implement cleaning of engine exhaust gas and improvement of fuel consumption efficiency. The construction of safe municipal and human settlements is strengthened in all countries to strengthen planning and management capacities for inclusive and sustainable municipal development and sustainable human settlements in all countries. Therefore, in all countries, there is a need to strengthen safe, affordable, accessible, and sustainable transport systems for all, improve road safety, especially the expansion of public transport, and reduce the municipal negative environmental impact per capita, including by paying particular attention to air quality, managing municipal waste, etc. In the field of transportation, in terms of the manufacturing of vehicles, there is an urgent need to take steps to address environmental concerns and develop technologies that can increase the rate of improvement in global energy efficiency.

In the manufacturing of vehicles in the prior art, a power steering device is usually used in an automobile as a device to reduce the steering force of a steering wheel and ensure the stability of a steering state. In this regard, a conventional hydraulic power steering system (HPS) using hydraulic pressure is widely used in the HPS system of the automobile. However, in contrast to the solution using hydraulic pressure, an electronic power steering system (EPS) uses the rotational force of a motor for the steering performance of a driver to be easy and to be environmentally friendly, so the recent EPS system has been widely assembled for use in the automobile.

In addition, the EPS system drives the motor through an electronic control unit (ECU) according to the driving situation of the automobile sensed by an automobile speed sensor, a steering angle sensor, a steering torque sensor, or the like, so as to provide a light and comfortable steering sensation when driving at a low speed, provide a heavy steering sensation and satisfactory directional stability when driving at a high speed, and provide a restoring force according to the steering angle of the steering wheel to quickly restore the steering wheel. Therefore, the EPS system can quickly steer in an emergency situation, thereby providing the driver with an optimal steering condition.

Meanwhile, in the EPS system, the motor is assembled on the outer side of a steering column, and the steering column is located between the steering wheel and a gear box to transmit a rotational force of the steering wheel of the driver downward, so the motor rotates the steering shaft in the steering column. Therefore, the steering force of the driver can be compensated according to the steering of the steering wheel.

In addition, in a torque rotor structure for a torque sensor structure disclosed in Patent Literature 1 (Japanese Patent No. 5207322), a magnet is adhesively fixed to an outer peripheral portion of a yoke fixed to an input shaft, and a tube body assembled to a stator is inserted and fixed to an inner peripheral portion of the yoke, so as to form the structure by caulking the three components. In the structure disclosed in Patent Literature 1, the positioning of the rotational position in the rotational direction is executed through engaging protrusions disposed on the yoke or the pipe body with grooves disposed on the magnet. In addition, all the components are formed by pressing or molding, and the assembly of the components is performed by respectively embedding all the protrusions in the grooves.

However, in the prior art, since all the components are formed by pressing or molding, the tolerance of parts cannot be reduced, and since all the protrusions need to be respectively embedded in the grooves during the assembly process, large gaps must be disposed in order for the protrusions to be embedded in the grooves. The gap is the rotational amount of the magnet when an adhesive between the magnet and the yoke is peeled off and has no adhesion (that is, the movable amount generated by the protrusion and the groove between the components is equal to the gap). Therefore, the larger the gap, the larger the rotational amount of the magnet when the adhesive is peeled off, which means that the amount of change in torque will be larger. As such, there are concerns about the behavior of the vehicle when the function of the torque sensor structure fails. Therefore, there is a need for a torque sensor apparatus capable of suppressing the behavior of the vehicle when the function of the torque sensor structure fails.

SUMMARY

The disclosure provides a torque sensor apparatus, which includes a rotor and a stator that are rotatable relative to each other and are respectively fixed to an input shaft and an output shaft. The torque sensor apparatus includes a sleeve, fixed to the input shaft and fixed to a magnet of the rotor; a position regulating portion, disposed on the magnet and restricting a rotational position of the magnet and the sleeve; and a protruding portion, disposed on the sleeve and installed corresponding to the position regulating portion. A front end of the protruding portion is enlarged along a circumferential direction of the sleeve.

DETAILED DESCRIPTION OF DISCLOSED EMBODIMENTS

Figure 1:
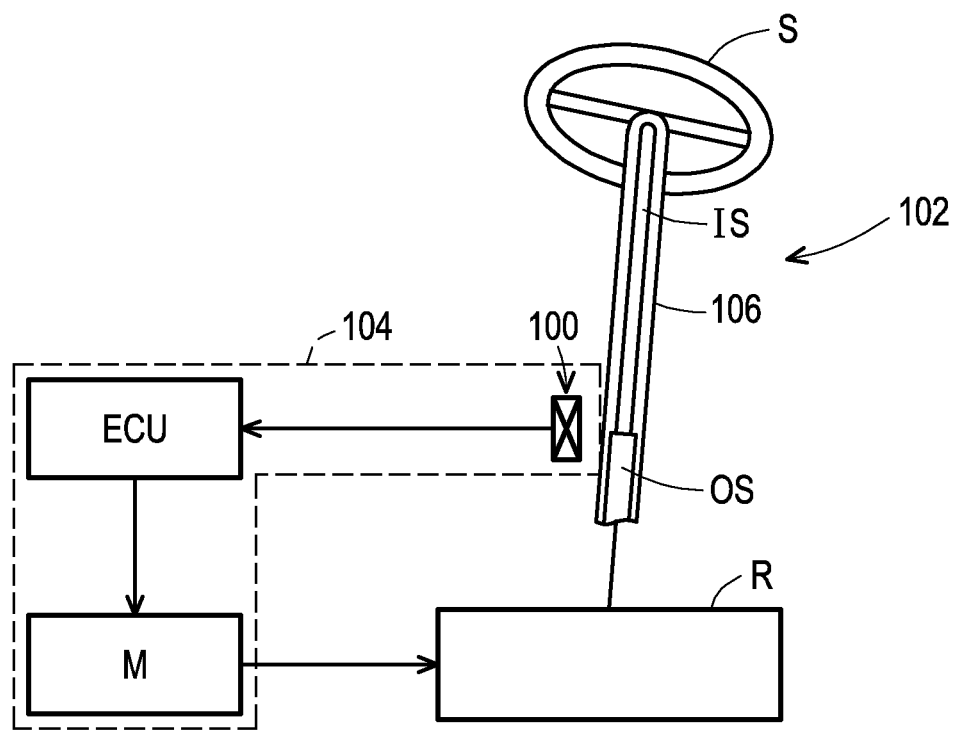
FIG. 1 is a schematic diagram of an example of a torque sensor apparatus applied to an electronic power steering system of a vehicle according to an embodiment of the disclosure.

The disclosure provides a torque sensor apparatus, which can suppress the behavior of the vehicle when the vehicle breaks down even when the adhesive between the magnet and a sleeve is peeled off through reducing a movable gap between a concave portion of the magnet and a protruding portion of the sleeve.

The disclosure provides a torque sensor apparatus, which includes a rotor and a stator that are rotatable relative to each other and are respectively fixed to an input shaft and an output shaft. The torque sensor apparatus includes a sleeve, fixed to the input shaft and fixed to a magnet of the rotor; a position regulating portion, disposed on the magnet and restricting a rotational position of the magnet and the sleeve; and a protruding portion, disposed on the sleeve and installed corresponding to the position regulating portion. A front end of the protruding portion is enlarged along a circumferential direction of the sleeve.

According to the disclosure, when an adhesive between the magnet and the sleeve is peeled off and has no adhesion, an amount of change in position in a rotational direction of the rotor is also reduced. Therefore, even if the adhesive of the magnet is peeled off, the influence on the behavior of the vehicle can be minimized.

Also, in the disclosure, the position regulating portion is a groove formed on a side edge of the magnet, and wall surfaces forming the groove and facing each other are parallel to the front end of the protruding portion.

According to the structure, even when the protruding portion of the sleeve is in contact with the wall surfaces of the groove of the magnet, since such contact may be referred to as a surface contact, and an elastic force of the protruding portion of the sleeve also reduces the stress generated during the contact, damage to the magnet can be prevented.

Furthermore, in the disclosure, the protruding portion is formed to be curved toward an outer side in a radial direction of the sleeve.

According to the structure, even when the adhesive between the magnet and the sleeve is peeled off and has no adhesion, the magnet can be prevented from falling off.

Also, in the disclosure, the front end of the protruding portion is directed toward the circumferential direction of the sleeve.

In this way, the protruding portion is in surface contact with the magnet during rotation, which can prevent damage to the magnet. If the magnet is contacted or collided with a relatively sharp side edge, the magnet may be broken.

Based on the above, in the torque sensor apparatus of the disclosure, through positioning the protruding portion of the sleeve corresponding to the position regulating portion of the magnet, and setting the protruding portion of the sleeve to expand along the circumferential direction, the gap between the protruding portion of the sleeve and the position regulating portion of the magnet can be reduced. When the adhesive between the magnet and the sleeve is peeled off and has no adhesion, the amount of change in position in the rotational direction of the rotor is also reduced. In addition, according to the design of the protruding portion of the sleeve and the groove of the magnet, the torque sensor apparatus of the disclosure is less susceptible to the influence of dimensional tolerances in the inter-fittable fitting structure between the magnet and the two fixed components of the magnet in the structure of the prior art and can effectively reduce the rotational amount when the adhesive between the magnet and a magnet fixing member is peeled off, so even when there is no adhesion, the influence on the behavior of the vehicle can be minimized.

Hereinafter, embodiments of the disclosure will be described based on the drawings. It should be noted that in each embodiment illustrated below, the same reference numeral is used for the same part, and repeated illustrated is omitted. Hereinafter, embodiments of the disclosure will be described with reference to the drawings. In the embodiment illustrated below, when referring to number, amount, etc., the scope of the disclosure is not necessarily limited to the number, the amount, etc. unless otherwise specified. In addition, in the following embodiments, each constituent element is not necessarily essential to the disclosure unless otherwise specified. In addition, when there are multiple embodiments below, the characteristic parts of the respective embodiments can be appropriately combined from the beginning unless otherwise specified.

Hereinafter, embodiments of the disclosure will be described with reference to the drawings. Hereinafter, a torque sensor apparatus of the embodiment will be described with reference to the drawings. FIG. 1 is a schematic diagram of an example of a torque sensor apparatus applied to an electronic power steering system of a vehicle according to an embodiment of the disclosure. As shown in FIG. 1, an electronic power steering system 10 of the vehicle includes a steering system 102 and an auxiliary power mechanism 104. The steering system 102 extends from a steering wheel S to wheels on two sides, and the auxiliary power mechanism 104 supplies steering auxiliary power to the steering system. 102. The steering system 102 includes a steering shaft 106, one side thereof is connected to the steering wheel S for common rotation with the steering wheel S, and the other side thereof is connected to a pinion shaft (not shown) through a pair of connecting joints (for example, universal joints) (not shown). Furthermore, the pinion shaft may be connected to a rack rod, for example, through a rack-gear mechanism member. Two sides of the rack rod may be connected to the wheels of the vehicle, for example, through a tie rod and a knuckle arm.

As shown in FIG. 1, the torque sensor apparatus 100 of the embodiment may be disposed in the auxiliary power mechanism 104 to sense a torque applied by a driver to the steering wheel S, and output an electronic signal in proportion to the torque. The auxiliary power mechanism also includes an electronic control unit ECU, a motor M, and a reducer R.

The electronic control unit ECU is used to generate a control signal based on the electronic signal transmitted from the torque sensor apparatus 100. The motor M is used to generate auxiliary power based on the control signal transmitted from the electronic control unit ECU. The reducer R may transmit the auxiliary power generated in the motor M to the steering shaft 106 through a worm gear and a worm wheel gear.

The steering shaft 106 is composed of an input shaft IS connected to the steering wheel S and an output shaft OS connected to the reducer R, and the torque sensor apparatus 100 is disposed at a position where the input shaft IS and the output shaft OS of the steering shaft 106 are connected. If the driver turns the steering wheel S, the input shaft IS connected to the steering wheel S will rotate, and the output shaft OS connected to the input shaft IS will also rotate along with the input shaft IS. The torque sensor apparatus 100 detects the torque of the input shaft IS and the output shaft OS of the steering shaft 106, and transmits the detected torque to the electronic control unit ECU. Next, the electronic control unit ECU drives the motor and supplies the steering auxiliary power. In this way, the torque sensor apparatus 100 detects the torque of the steering shaft 106 in a non-contact manner, detects the amount of change in magnetic field, and detects changes in the torque based on the detected amount of change in magnetic field.

The torque sensor apparatus 100 includes a rotor 110 and a stator 120 that are rotatable relative to each other. For example, the rotor 110 is fixed to the input shaft IS, and the stator 120 is fixed to the output shaft OS. The torque sensor apparatus 100 further includes a magnetic charge detecting member (not shown). For example, the electronic control unit ECU receives a variation quantity of magnetic flux detected by the magnetic charge detecting member, and drives the motor based on the received variation quantity of magnetic flux to compensate for the steering power of the driver. The magnetic charge detecting member may, for example, be installed on an outer peripheral surface of the stator 120 and include a concentrator, and the magnetic charge detecting member may rotate relative to the stator 120.

At this time, if a torsion force is generated between the input shaft IS and the output shaft OS, a rotational angle difference will be generated between the stator 120 and the input shaft IS, wherein the stator 120 is, for example, pressed and installed on the output shaft OS. If the rotational angle difference is generated, a magnetic field formed at the torque sensor apparatus 100 (for example, between the stator 120 and the magnet of the rotor 110) will change. Therefore, the torsion force may be detected through the quantity of magnetic flux collected in the concentrator of the magnetic charge detecting member.

Figure 2:
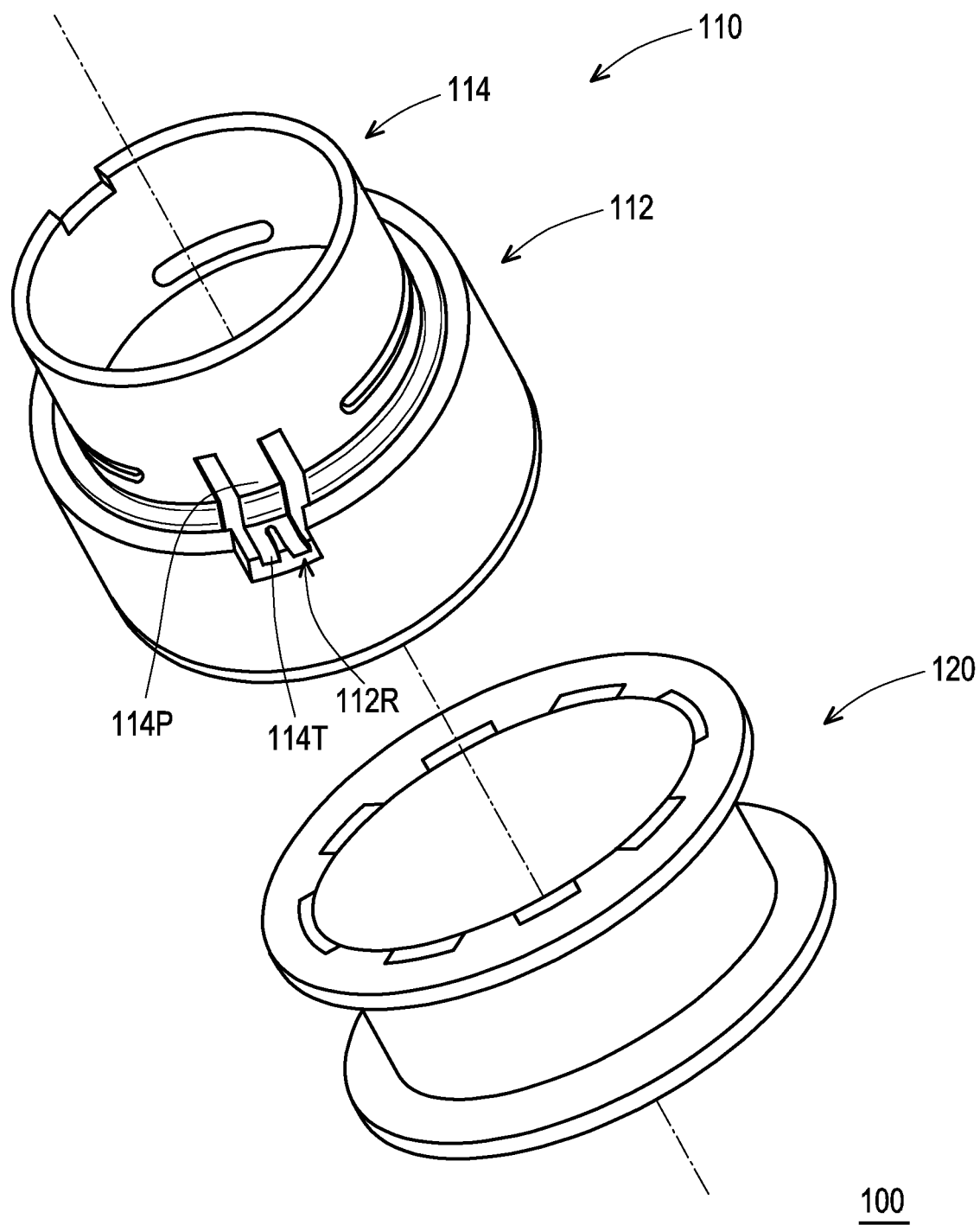
FIG. 2 a schematic diagram of an example of the torque sensor apparatus of FIG. 1.
Figure 3:
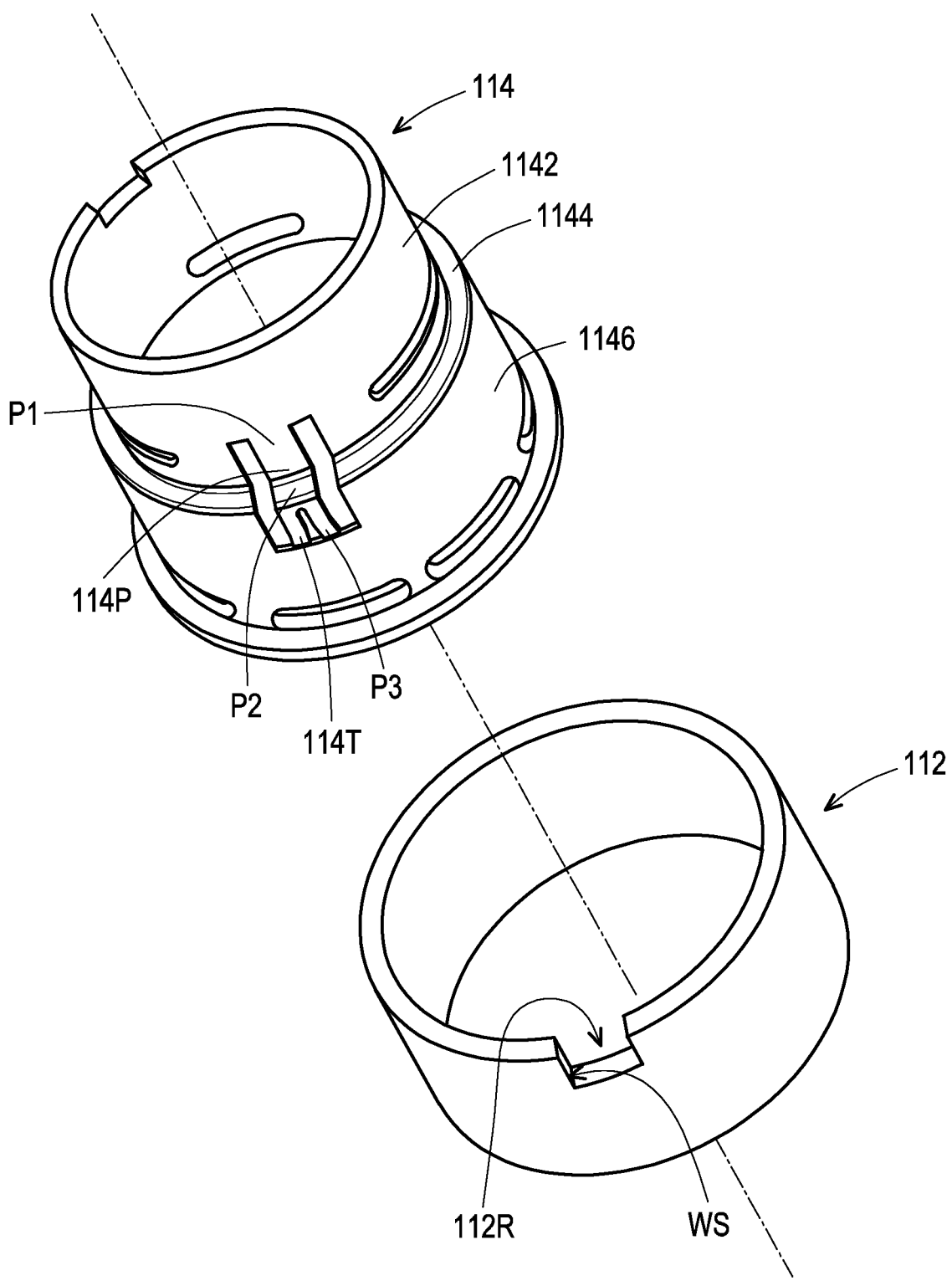
FIG. 3 is a schematic diagram of a separated example of a sleeve and a magnet of the torque sensor apparatus of FIG. 2.

FIG. 2 a schematic diagram of an example of the torque sensor apparatus of FIG. 1. FIG. 3 is a schematic diagram of a separated example of a sleeve and a magnet of the torque sensor apparatus of FIG. 2. As shown in FIG. 1 to FIG. 3, the torque sensor apparatus 100 of the embodiment includes the rotor 110 and the stator 120 that are rotatable relative to each other and are respectively fixed to the input shaft IS and the output shaft OS. The torque sensor apparatus 100 is composed of a magnet 112 and a sleeve 114, wherein the sleeve 114 is fixed to the input shaft IS, and the sleeve 114 is fixed to the magnet 112. A position regulating portion 112R is formed on the magnet 112 to regulate a rotational position of the magnet 112 and the sleeve 114. A protruding portion 114P is formed on the sleeve 114 to be installed corresponding to the position regulating portion 112R, so that the rotational position of the magnet 112 and the sleeve 114 is restricted. A front end 114T of the protruding portion 114P of the sleeve 114 is enlarged along a circumferential direction of the sleeve 114.

An adhesive may be used to fix the magnet 112 and the sleeve 114. For example, the adhesive may be coated on an inner peripheral surface of the magnet 112 and an outer peripheral surface of the sleeve 114. The adhesive can prevent the magnet 112 and the sleeve 114 from idling during assembly. In addition, a corresponding protruding portion 1114P of the sleeve 114 may be inserted into the position regulating portion 112R of the magnet 112, so the front end 114T of the protruding portion 114P of the sleeve 114 is located in the position regulating portion 112R of the magnet 112, so that the rotational position of the magnet 112 and the sleeve 114 is restricted.

In this way, as shown in FIG. 2, the protruding portion 114P is disposed on the sleeve 114, and the position regulating portion 112R is disposed on the magnet 112. Through positioning the protruding portion 114P of the sleeve 114 corresponding to the position regulating portion 112R of the magnet 112, and setting the protruding portion 114P of the sleeve 114 to expand along the circumferential direction, the gap between the protruding portion 114P of the sleeve 114 and the position regulating portion 112R of the magnet 112 can be reduced. When the adhesive between the magnet 112 and the sleeve 114 is peeled off and has no adhesion, the amount of change in position in the rotational direction of the rotor 110 is also reduced. Therefore, even if the adhesive of the magnet 112 is peeled off, the influence on the behavior of the vehicle can be minimized.

In the embodiment, as shown in FIG. 2 and FIG. 3, the sleeve 114 may be formed of a tubular material, and the sleeve 114 includes a small diameter portion 1142, a large diameter portion 1146, and a stepped portion 1144 continuous between the small diameter portion 1142 and the large diameter portion 1146, wherein an inner diameter of the large diameter portion 1146 is larger than an inner diameter of the small diameter portion 1142. The large diameter portion 1146 is inserted into the inner peripheral surface of the magnet 112 when the sleeve 114 and the magnet 112 are assembled, the large diameter portion 1146 is assembled to the stator 120, and the small diameter portion 1142 is fixed to the input shaft IS. The stepped portion 1144 is formed by connecting the small diameter portion 1142 and the large diameter portion 1146.

As shown in FIG. 3, the protruding portion 114P of the sleeve 114 is formed on a pipe wall of a pipe body of the sleeve 114. For example, a tongue-shaped member is formed by removing a part of the material of the pipe wall and has a connecting end continuous to the material of the pipe wall of the sleeve 114 and a free end (for example, the front end 114T of FIG. 3) that is not connected to the material of the pipe wall. Further, the protruding portion 114P (the tongue-shaped member) is formed to extend from the small diameter portion 1142 toward the large diameter portion 1146 along an axial direction, continuously cross the stepped portion 1144, and reach the large diameter portion 1146. In other words, the protruding portion 114P is formed by a connecting end P1 extending from the small diameter portion 1142, a curved portion P2 crossing the stepped portion 1144, and a free end P3 located at the large diameter portion 1146.

As shown in FIG. 3, the magnet 112, for example, has an annular shape and surrounds an outer peripheral surface of the large diameter portion 1146 of the sleeve 114, and may be fixed to the sleeve 114 through the adhesive. The position regulating portion 112R of the magnet 112 is formed on a side edge of the magnet 112 (for example, an upper end edge of the magnet 112 in FIG. 3) and is formed by, for example, removing a part of the material of the side edge. As shown in FIG. 3, the position regulating portion 112R has a groove shape. For example, the design of the groove may correspond to the contour and the size of the front end 114T of the protruding portion 114P to be accommodated.

Further, as shown in FIG. 3, the protruding portion 114P of the sleeve 114 is formed to be curved toward an outer side in a radial direction of the sleeve 114. In this way, through forming the protruding portion 114P of the sleeve 114 to be curved toward the outer side in the radial direction, that is, the free end P3 of the protruding portion 114P protrudes toward the outer side in the radial direction, even when the adhesive between the magnet 112 and the sleeve 114 is peeled off and has no adhesion, the magnet 112 can be prevented from falling off.

In the embodiment, one protruding portion 114P is disposed on the sleeve 114 as an example, but the disclosure is not limited thereto. One position regulating portion 112R may be disposed on the magnet 112, or more than one position regulating portions 112R may be disposed, so that the protruding portion 114P can correspond to the position regulating portions 112R more quickly during assembly. Wall surfaces WS of the position regulating portion 112R forming the groove and facing each other are substantially parallel to the front end 114T of the protruding portion 114P.

As such, through setting the wall surfaces WS forming the groove on the magnet 112 to be substantially parallel to the front end 114T of the protruding portion 114P of the sleeve 114, even when the sleeve 114 is in contact with the magnet 112, that is, even when the protruding portion 114P of the sleeve 114 is in contact with the wall surfaces WS of the groove of the magnet 112, since such contact may be referred to as a surface contact, and an elastic force of the protruding portion 114P of the sleeve 114 also reduces the stress generated during the contact, damage to the magnet 112 can be prevented.

Figure 4:
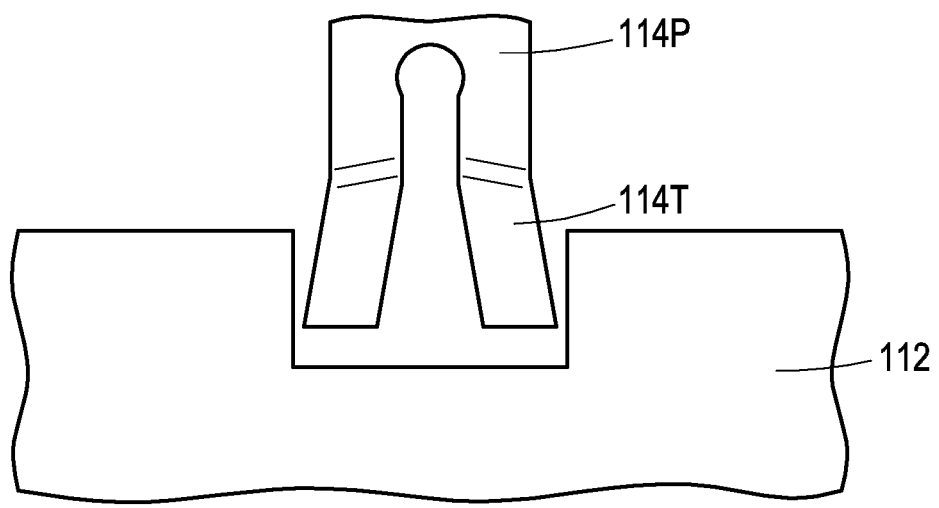
FIG. 4 a schematic diagram of an example of a front end of a protruding portion of the sleeve.

FIG. 4 a schematic diagram of an example of a front end of a protruding portion of the sleeve. As shown in FIG. 4, the front end 114T of the protruding portion 114P of the sleeve 114 is directed toward the circumferential direction of the sleeve 114. In this way, through forming the front end 114T of the protruding portion 114P of the sleeve 114 to be branched, such as a fork shape or a Y-shape, the two front ends 114T are respectively directed toward the left and the right along the circumferential direction. That is, the protruding portion 114P of the sleeve 114 is curved toward the outer side in the radial direction (the part of the free end P3). Through setting the sleeve 114 such that the front end 114T of the protruding portion 114P is directed toward the circumferential direction of the sleeve 114, the gap between the protruding portion 114P of the sleeve 114 and the position regulating portion 112R of the magnet can be reduced, and even when the adhesive between the magnet 112 and the sleeve 114 is peeled off and has no adhesion, the amount of change in position in the rotational direction of the rotor 110 is also reduced. Therefore, even if the adhesive between the magnet 112 and the sleeve 114 is peeled off, the influence on the vehicle can be minimized.

Figure 5:
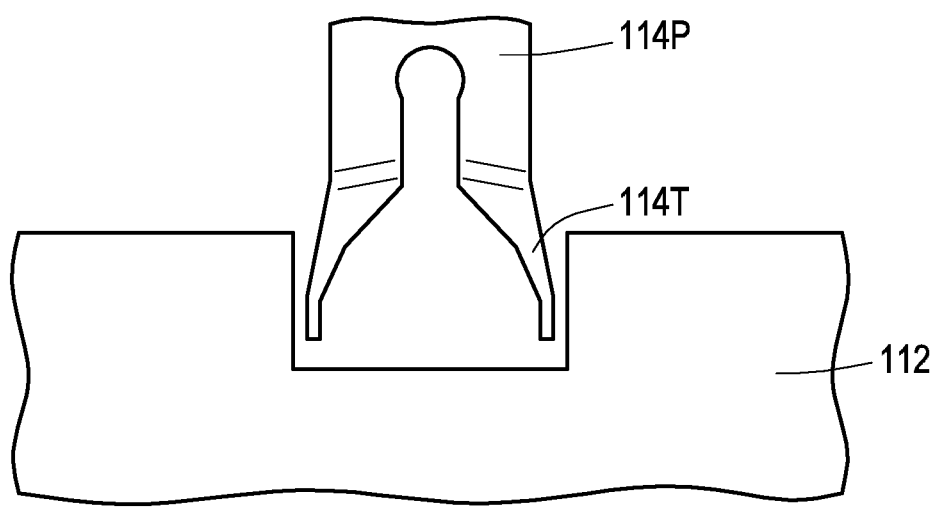
FIG. 5 is a schematic diagram of another example of a front end of a protruding portion of the sleeve.

FIG. 5 is a schematic diagram of another example of a front end of a protruding portion of the sleeve. The front end 114T of the protruding portion 114P shown in FIG. 5 is different from the front end 114T shown in FIG. 4 only in that the fork-forming part of the front end 114T of FIG. 5 faces the left and the right in the circumferential direction, and the protruding portion 114P is in surface contact with the magnet 112 during rotation, which can prevent damage to the magnet 112. If the magnet 112 is contacted or collided with a relatively sharp side edge, the magnet 112 may be broken.

In summary, in the torque sensor apparatus of the disclosure, the protruding portion is disposed on the sleeve, and the position regulating portion, that is, the groove, is disposed on the magnet. Through positioning the protruding portion of the sleeve corresponding to the position regulating portion of the magnet, and setting the protruding portion of the sleeve to expand along the circumferential direction, the gap between the protruding portion of the sleeve and the position regulating portion of the magnet can be reduced. When the adhesive between the magnet and the sleeve is peeled off and has no adhesion, the amount of change in position in the rotational direction of the rotor is also reduced. Therefore, even if the adhesive of the magnet is peeled off, the influence on the behavior of the vehicle can be minimized. In addition, according to the design of the protruding portion of the sleeve and the groove of the magnet, the torque sensor apparatus of the disclosure is less susceptible to the influence of dimensional tolerances in the inter-fittable fitting structure between the magnet and the two fixed components of the magnet in the structure of the prior art and can effectively reduce the rotational amount when the adhesive between the magnet and a magnet fixing member is peeled off, so even when there is no adhesion, the influence on the behavior of the vehicle can be minimized.

Finally, it should be noted that the above embodiments are only used to illustrate, but not to limit, the technical solutions of the disclosure. Although the disclosure has been described in detail with reference to the above embodiments, persons skilled in the art should understand that the technical solutions described in the above embodiments can still be modified or some or all of the technical features thereof can be equivalently replaced. However, the modifications or replacements do not cause the essence of the corresponding technical solutions to deviate from the scope of the technical solutions of the embodiments of the disclosure.

What is claimed is:

1. A torque sensor apparatus, comprising a rotor and a stator, rotatable relative to each other and respectively fixed to an input shaft and an output shaft, the torque sensor apparatus comprising:
   a sleeve, fixed to the input shaft and fixed to a magnet of the rotor;
   a position regulating portion, disposed on the magnet and restricting a rotational position of the magnet and the sleeve; and
   a protruding portion, disposed on the sleeve and installed corresponding to the position regulating portion, wherein
   a front end of the protruding portion is larger than another portion of the protruding portion along a circumferential direction of the sleeve, and
   a centerline of the protruding portion is directed toward the circumferential direction of the sleeve.

2. The torque sensor apparatus according to claim 1, wherein:
   the position regulating portion is a groove formed on a side edge of the magnet, and wall surfaces forming the groove and facing each other are parallel to the front end of the protruding portion.

3. The torque sensor apparatus according to claim 1, wherein:
   the protruding portion is formed to be curved toward an outer side in a radial direction of the sleeve.

4. The torque sensor apparatus according to claim 1, wherein:
   the front end of the protruding portion is directed toward the circumferential direction of the sleeve.

* * * * *